(12) United States Patent
Miller

(10) Patent No.: US 11,805,766 B1
(45) Date of Patent: Nov. 7, 2023

(54) TENSION-ADJUSTING FISHING POLE

(71) Applicant: Benny H. Miller, Taylors, SC (US)

(72) Inventor: Benny H. Miller, Taylors, SC (US)

( * ) Notice: Subject to any disclaimer, the term of this patent is extended or adjusted under 35 U.S.C. 154(b) by 119 days.

(21) Appl. No.: 17/674,056

(22) Filed: Feb. 17, 2022

Related U.S. Application Data

(63) Continuation-in-part of application No. 16/781,531, filed on Feb. 4, 2020, now Pat. No. 11,266,137.

(51) Int. Cl.
*A01K 87/00* (2006.01)
*A01K 87/02* (2006.01)

(52) U.S. Cl.
CPC .................... *A01K 87/02* (2013.01)

(58) Field of Classification Search
CPC ..................................... A01K 87/00
USPC ......... 220/4.12, 4.13, 4.16, 4.21, 4.24, 4.28, 220/4.33, 501, 506
See application file for complete search history.

(56) References Cited

U.S. PATENT DOCUMENTS

| | | |
|---|---|---|
| 4,800,668 A | 1/1989 | Burrough |
| 5,316,300 A | 5/1994 | Simmons |
| 5,632,693 A | 5/1997 | Painter |
| 6,361,451 B1 | 3/2002 | Masters |
| 7,226,365 B2 | 6/2007 | Qualizza |
| 2009/0163288 A1 | 6/2009 | Qualizza |

FOREIGN PATENT DOCUMENTS

| | | |
|---|---|---|
| WO | 2000016857 | 3/2000 |

*Primary Examiner* — Joshua J Michener
*Assistant Examiner* — Henry Hooper Mudd
(74) *Attorney, Agent, or Firm* — Kyle A. Fletcher, Esq.

(57) ABSTRACT

The tension-adjusting fishing pole has a composite prism structure. The tension-adjusting fishing pole is a flexible structure with an elastic nature. By flexible is meant that the tension-adjusting fishing pole will deform when a deformation force is applied to the tension-adjusting fishing pole from a direction that is perpendicular to the center axis of the composite prism structure of the tension-adjusting fishing pole. The tension-adjusting fishing pole has an adjustable stiffness. By adjustable stiffness is meant that the modulus of the response of the tension-adjusting fishing pole to the deformation force is adjustable. The tension-adjusting fishing pole comprises a first pole structure, a second pole structure, a fitting structure, and a plurality of working fluids. The fitting structure attaches the first pole structure to the second pole structure to form a fluid impermeable containment structure. The plurality of working fluids are contained in the fluid impermeable containment structure.

15 Claims, 4 Drawing Sheets

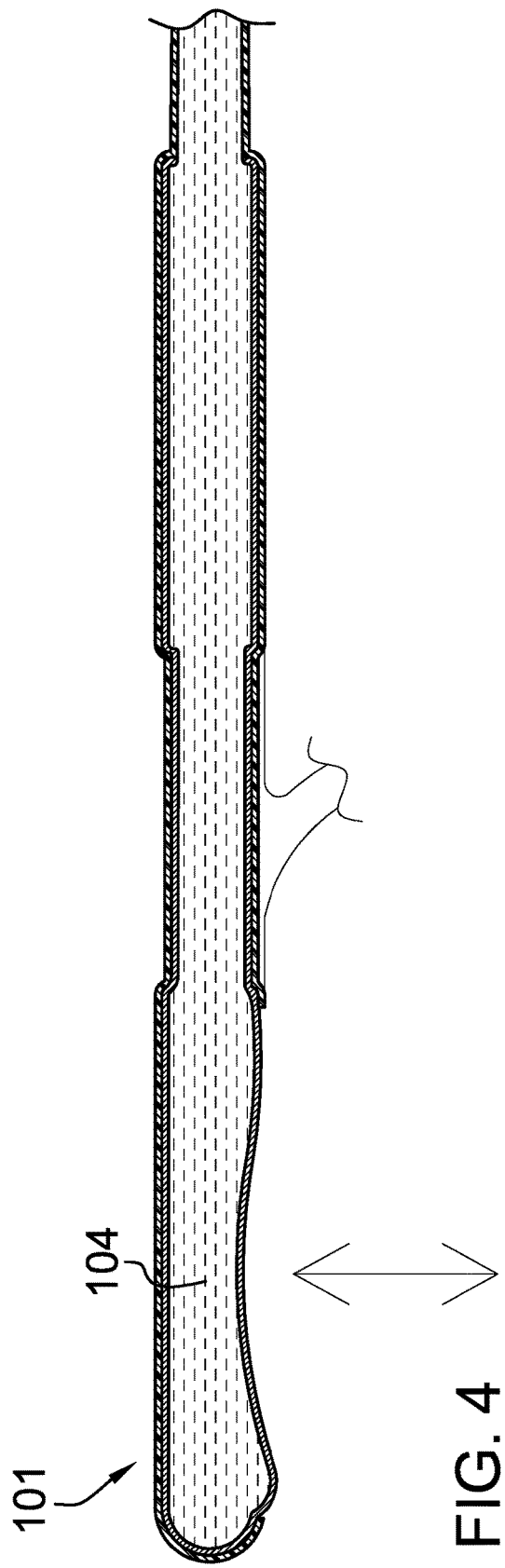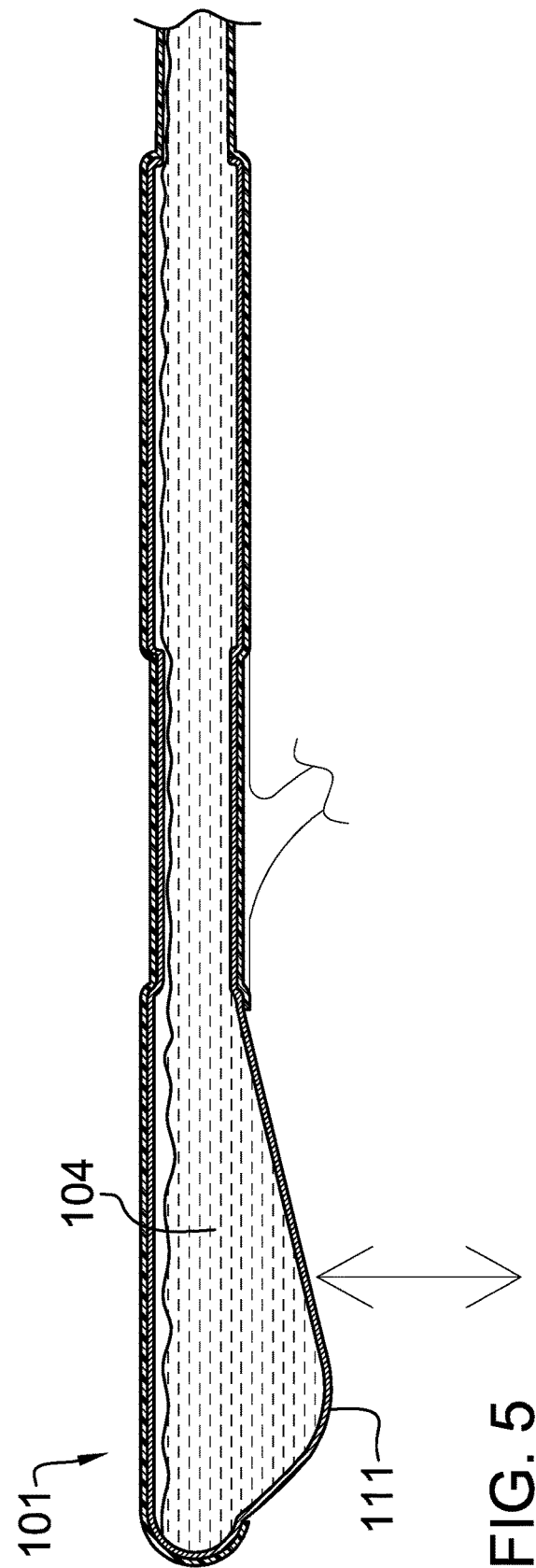

TENSION-ADJUSTING FISHING POLE

CROSS REFERENCES TO RELATED APPLICATIONS

This non-provisional patent application claims priority to U.S. non-provisional patent application Ser. No. 16/781,531 that was filed on Feb. 4, 2020 by the applicant, Benny Miller.

STATEMENT REGARDING FEDERALLY SPONSORED RESEARCH

Not Applicable

REFERENCE TO APPENDIX

Not Applicable

BACKGROUND OF THE INVENTION

Field of the Invention

This non-provisional application claims priority under 35 USC 120 to United States non-provisional application U.S. Ser. No. 16/781,531 filed on Feb. 4, 2020 by the inventor, Mr. B Miller. This non-provisional application claims United States non-provisional application U.S. Ser. No. 16/781,531 in its entirety.

SUMMARY OF INVENTION

The tension-adjusting fishing pole is a fishing rod. The tension-adjusting fishing pole has a composite prism structure. The tension-adjusting fishing pole is a flexible structure with an elastic nature. By flexible is meant that the tension-adjusting fishing pole will deform when a deformation force is applied to the tension-adjusting fishing pole from a direction that is perpendicular to the center axis of the composite prism structure of the tension-adjusting fishing pole. The tension-adjusting fishing pole has an adjustable stiffness. By adjustable stiffness is meant that the modulus of the response of the tension-adjusting fishing pole to the deformation force is adjustable. The tension-adjusting fishing pole comprises a first pole structure, a second pole structure, a fitting structure, and a plurality of working fluids. The fitting structure attaches the first pole structure to the second pole structure to form a fluid impermeable containment structure. The plurality of working fluids are contained in the fluid impermeable containment structure.

These together with additional objects, features and advantages of the tension-adjusting fishing pole will be readily apparent to those of ordinary skill in the art upon reading the following detailed description of the presently preferred, but nonetheless illustrative, embodiments when taken in conjunction with the accompanying drawings.

In this respect, before explaining the current embodiments of the tension-adjusting fishing pole in detail, it is to be understood that the tension-adjusting fishing pole is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tension-adjusting fishing pole.

It is therefore important that the claims be regarded as including such equivalent construction insofar as they do not depart from the spirit and scope of the tension-adjusting fishing pole. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a cross-sectional view of an embodiment of the disclosure across 4-4 as shown in FIG. 2.
FIG. 5 is an in-use (compressed) view of FIG. 4.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
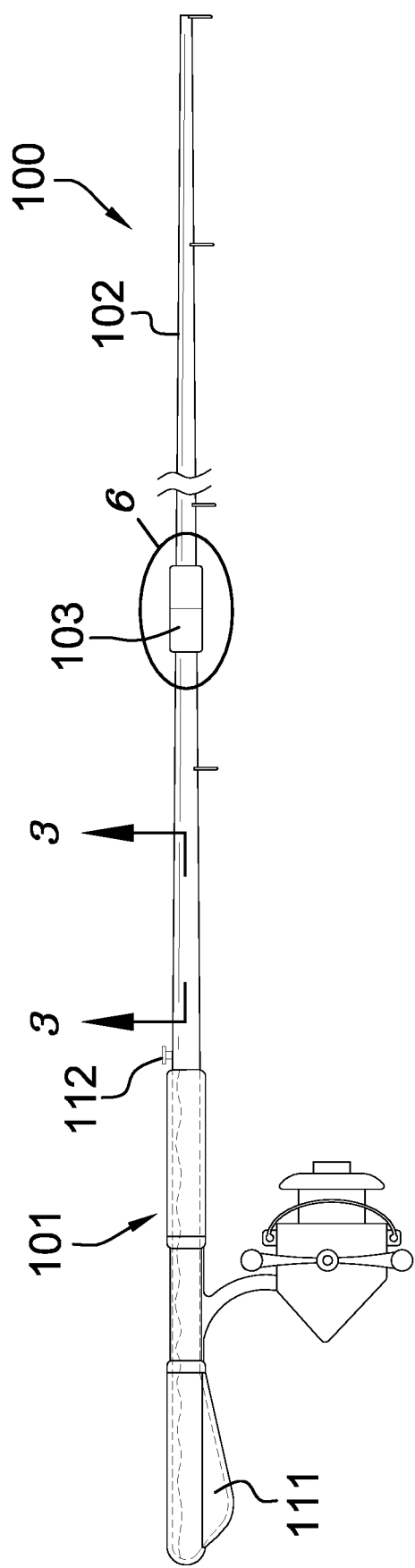
FIG. 1 is a front view of an embodiment of the disclosure.
Figure 2:
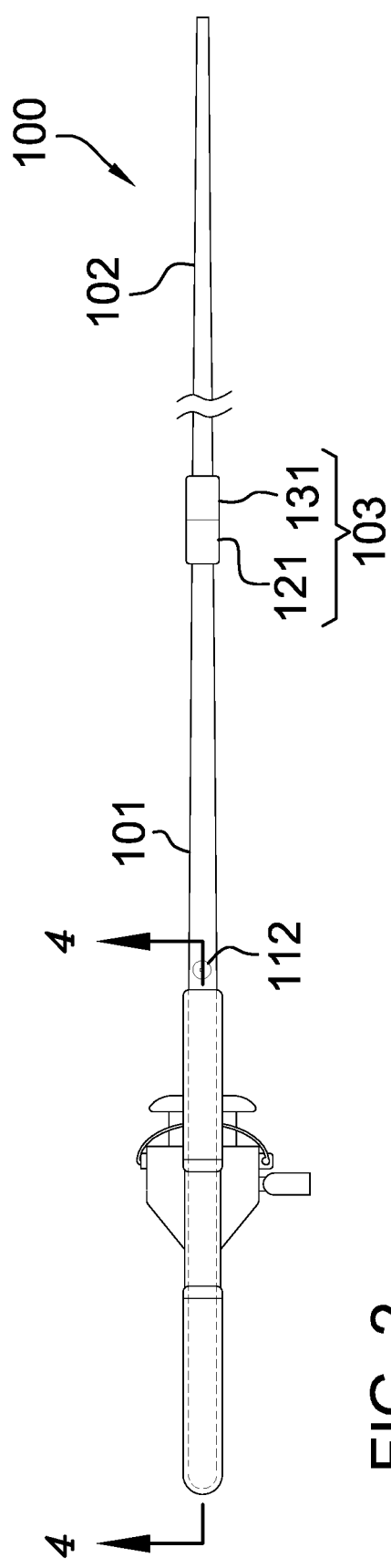
FIG. 2 is a top view of an embodiment of the disclosure.
Figure 3:
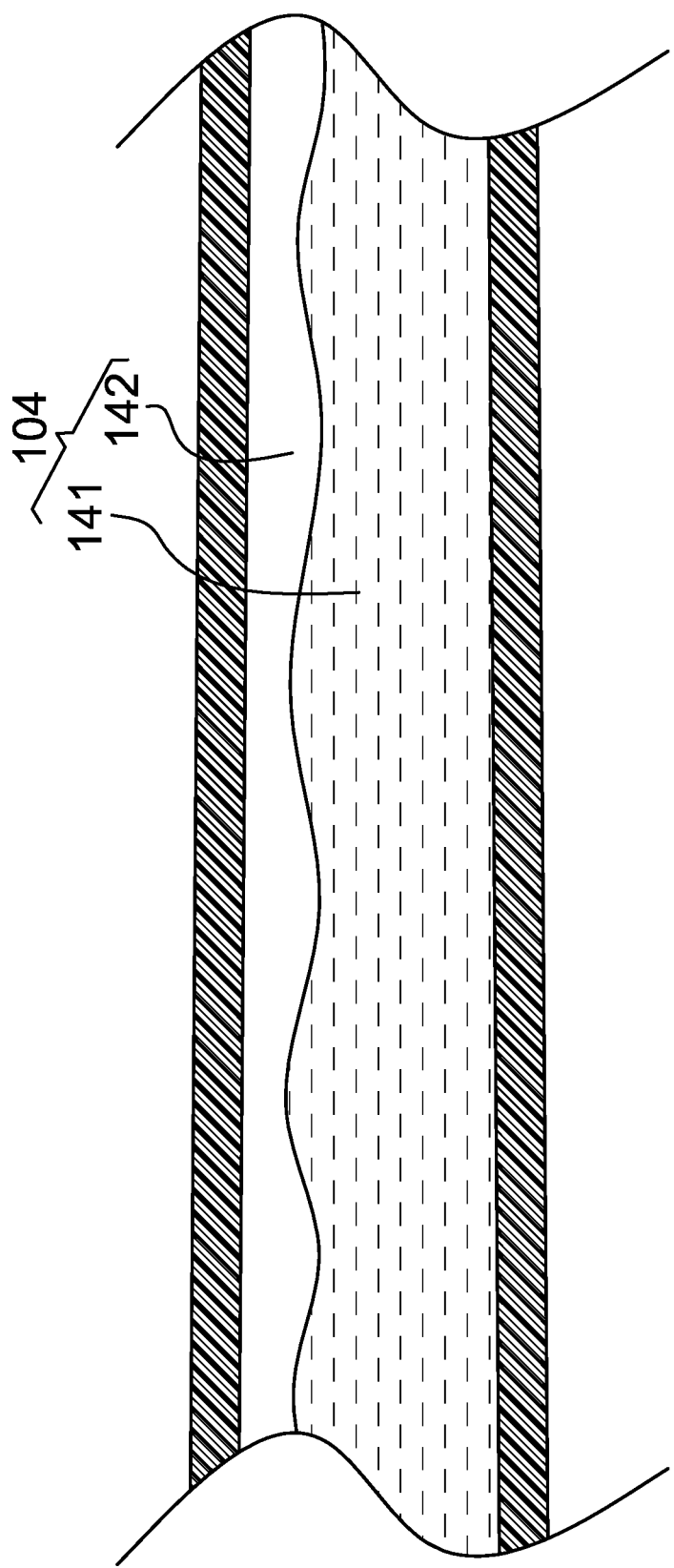
FIG. 3 is a cross-sectional view of an embodiment of the disclosure across 3-3 as shown in FIG. 1.
Figure 6:
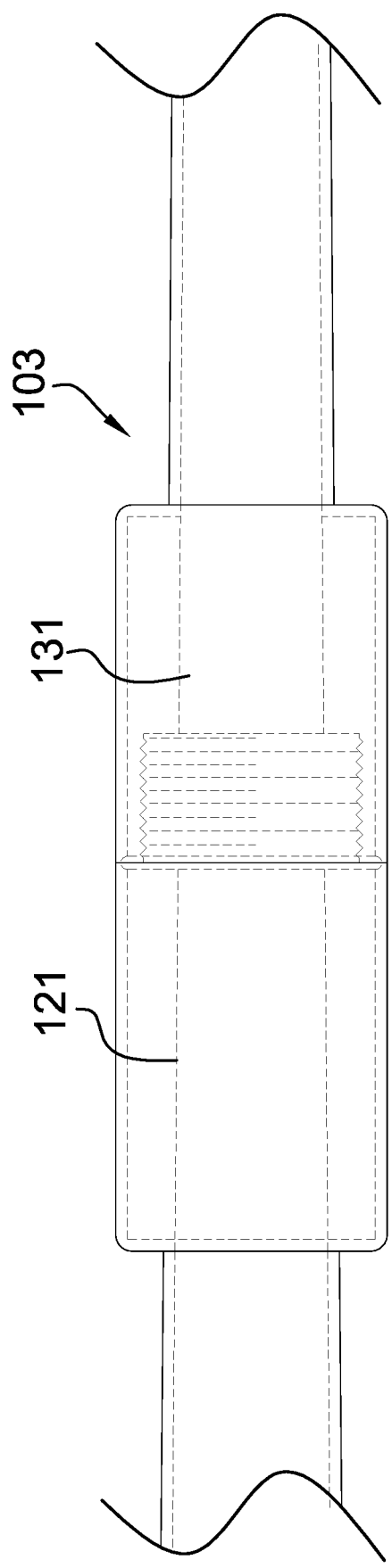
FIG. 6 is a detail view of an embodiment of the disclosure.
Figure 7:
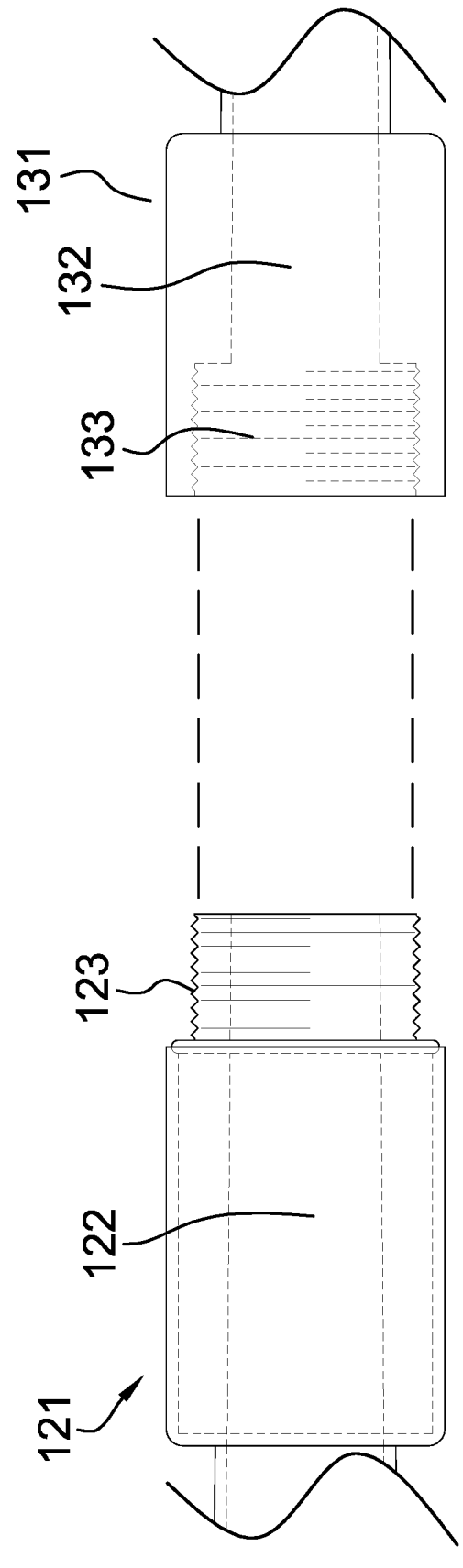
FIG. 7 is a detail view of an embodiment of the disclosure.

Detailed reference will now be made to one or more potential embodiments of the disclosure, which are illustrated in FIGS. 1 through 7.

The tension-adjusting fishing pole 100 (hereinafter invention) is a fishing rod. The invention 100 has a composite prism structure. The invention 100 is a flexible structure with an elastic nature. By flexible is meant that the invention 100 will deform when a deformation force is applied to the invention 100 from a direction that is perpendicular to the center axis of the composite prism structure of the invention 100. The invention 100 has an adjustable stiffness. By adjustable stiffness is meant that the modulus of the response of the invention 100 to the deformation force is adjustable. The invention 100 comprises a first pole structure 101, a second pole structure 102, a fitting structure 103 and a plurality of working fluids 104. The fitting structure 103 attaches the first pole structure 101 to the second pole structure 102 to form a fluid impermeable containment structure. The plurality of working fluids 104 are contained in the fluid impermeable containment structure.

The first pole structure 101 has the primary shape of a prism structure. The first pole structure 101 is a hollow structure. The first pole structure 101 is a flexible structure with an elastic nature. The first pole structure 101 has a semi-enclosed prism structure. The characteristic negative space that defines the semi-enclosed prism structure of the first pole structure 101. The first pole structure 101 has a tapered prism structure. The first pole structure 101 has a tubular structure. The first pole structure 101 has a capped tube structure. The first pole structure 101 forms a portion of the structure that contains the plurality of working fluids 104. The first pole structure 101 forms the structure that adjusts the pressure of the plurality of working fluids 104 contained within the invention 100. The first pole structure 101 further comprises a compression membrane 111 and a relief valve 112.

The compression membrane 111 is a sheeting structure. The compression membrane 111 is a flexible structure. The compression membrane 111 is a fluid impermeable structure. The compression membrane 111 encloses the characteristic negative space that defines the semi-enclosed prism structure. The compression membrane 111 forms a fluid impermeable seal with boundary of the characteristic negative space that defines the semi-enclosed prism structure.

The flexible nature of the compression membrane 111 allows the membrane to be pushed into the section of the enclosed fluid impermeable containment structure that is formed by the first pole structure 101. By pushing the compression membrane 111 through the characteristic negative space of the first pole structure 101, the compression membrane 111 reduces the volume of the enclosed fluid impermeable containment structure. The reduction of the volume in the enclosed fluid impermeable containment structure by the compression membrane 111 compresses the gas phase working fluid 142 contained within the invention 100. The compression of the gas phase working fluid 142 by the compression membrane 111 increases the proportion of the volume of the liquid phase working fluid 141 relative to the volume of the enclosed fluid impermeable containment structure.

The relief valve 112 is a valve. The relief valve 112 forms a fluidic connection between the plurality of working fluids 104 and the atmosphere. The relief valve 112 allows for the introduction of the liquid phase working fluid 141 into the enclosed fluid impermeable containment structure of the invention 100. The relief valve 112 further provides a method for the equalization of pressures between the plurality of working fluids 104 and the atmosphere.

The second pole structure 102 has the primary shape of a prism structure. The second pole structure 102 is a hollow structure. The second pole structure 102 is a flexible structure with an elastic nature. The second pole structure 102 has a tapered prism structure. The second pole structure 102 has a tubular structure. The second pole structure 102 has a capped tube structure. The second pole structure 102 forms a portion of the structure that contains the plurality of working fluids 104. The second pole structure 102 forms the structure that adjusts the pressure of the plurality of working fluids 104 contained within the invention 100.

The fitting structure 103 is a fitting. The fitting structure 103 attaches the first pole structure 101 to the second pole structure 102 to form a composite prism structure. The fitting structure 103 attaches the first pole structure 101 to the second pole structure 102 to form an enclosed fluid impermeable containment structure. The enclosed fluid impermeable containment structure contains the plurality of working fluids 104. The fitting structure 103 forms a fluidic connection between first pole structure 101 and the second pole structure 102. The fitting structure 103 attaches the open end of the capped tube structure of the first pole structure 101 to the open end of the capped tube structure of the second pole structure 102. The fitting structure 103 forms a fluid impermeable seal between the first pole structure 101 and the second pole structure 102. The fitting structure 103 further comprises a first fitting element 121 and a second fitting element 131.

The first fitting element 121 is a mechanical structure. The first fitting element 121 is a composite prism shaped structure. The first fitting element 121 is a tubular structure. The first fitting element 121 forms a fluidic connection between the plurality of working fluids 104 contained within the first pole structure 101 and the second fitting element 131. The first fitting element 121 attaches to the open end of the capped tube structure of the first pole structure 101 to form a composite prism structure. The first fitting element 121 attaches to the second fitting element 131 to secure the first pole structure 101 to the second pole structure 102 to form the enclosed fluid impermeable containment structure. The first fitting element 121 forms a fluid impermeable seal with the second fitting element 131. The first fitting element 121 further comprises a first channel 122 and a first screw thread 123.

The first channel 122 is a negative space that forms a prism shaped structure within the first fitting element 121. The first channel 122 forms a composite prism structure with the first fitting element 121. The first channel 122 is geometrically identical to the open face of the capped tube structure of the first pole structure 101. The first fitting element 121 attaches to the first pole structure 101 such that the lateral face of the first channel 122 is flush with the hollow interior surface of the capped tube structure of the first pole structure 101. The flush fit between the first channel 122 and the first pole structure 101 ensures that the performance of the plurality of working fluids 104 is not degraded by the occurrence turbulence or water hammer effects within the plurality of working fluids 104.

The first screw thread 123 forms a portion of a threaded connection that attaches the first fitting element 121 to the second fitting element 131. The first screw thread 123 forms a fluid impermeable seal between the first fitting element 121 and the second fitting element 131. The first screw thread 123 is selected from the group consisting of an exterior screw thread and an interior screw thread.

The second fitting element 131 is a mechanical structure. The second fitting element 131 is a composite prism shaped structure. The second fitting element 131 is a tubular structure. The second fitting element 131 forms a fluidic connection between the plurality of working fluids 104 contained within the second pole structure 102 and the first fitting element 121. The second fitting element 131 attaches to the open end of the capped tube structure of the second pole structure 102 to form a composite prism structure. The second fitting element 131 attaches to the first fitting element 121 to secure the second pole structure 102 to the second pole structure 102 to form the enclosed fluid impermeable containment structure. The second fitting element 131 forms a fluid impermeable seal with the first fitting element 121. The second fitting element 131 further comprises a second channel 132 and a second screw thread 133.

The second channel 132 is a negative space that forms a prism shaped structure within the second fitting element 131. The second channel 132 forms a composite prism structure with the second fitting element 131. The second channel 132 is geometrically identical to the open face of the capped tube structure of the second pole structure 102. The second fitting element 131 attaches to the second pole structure 102 such that the lateral face of the second channel 132 is flush with the hollow interior surface of the capped tube structure of the second pole structure 102. The flush fit between the second channel 132 and the second pole structure 102 ensures that the performance of the plurality of working fluids 104 is not degraded by the occurrence turbulence or water hammer effects within the plurality of working fluids 104.

The second screw thread 133 forms a portion of a threaded connection that attaches the second fitting element 131 to the first fitting element 121. The second screw thread 133 forms a fluid impermeable seal between the second fitting element 131 and the first fitting element 121. The second screw thread 133 is selected from the group consisting of an exterior screw thread and an interior screw thread. The selected second screw thread 133 is the screw thread that was not selected to be the first screw thread 123. The second screw thread 133 forms a threaded connection with the first screw thread 123. The second screw thread 133 secures to the first screw thread 123 such that the lateral face of the second screw thread 133 is flush with the lateral face of the first screw thread 123. The flush fit between the second channel 132 and the first channel 122 ensures that the performance of the plurality of working fluids 104 within the enclosed fluid impermeable containment structure is not degraded by the occurrence turbulence or water hammer effects within the plurality of working fluids 104.

The plurality of working fluids 104 form the fluids that are contained within the enclosed fluid impermeable containment structure formed by the invention 100. The plurality of working fluids 104 is formed from a combination of a compressible working fluid and an incompressible working fluid. In the first potential embodiment of the disclosure, the compressible working fluid is a gas phase working fluid 142 and the incompressible working fluid is a liquid phase working fluid 141.

The modulus of the invention 100 changes by adjusting the pressure of the plurality of working fluids 104 within the enclosed fluid impermeable containment structure formed by the invention 100. The volume of the enclosed fluid impermeable containment structure is changed such that the pressure of the gas phase working fluid 142 within the enclosed fluid impermeable containment structure changes. The change of pressure of the gas phase working fluid 142 within the enclosed fluid impermeable containment structure changes the proportion of the volume of the enclosed fluid impermeable containment structure that is filled by the liquid phase working fluid 141.

The modulus of the invention 100 changes as a positive function of the proportion of the volume of the enclosed fluid impermeable containment structure that is filled by the liquid phase working fluid 141. Specifically, the modulus of the invention 100 increases as the proportion of the volume of the liquid phase working fluid 141 relative to the volume of the enclosed fluid impermeable containment structure increases. The modulus of the invention 100 decreases as the proportion of the volume of the liquid phase working fluid 141 relative to the volume of the enclosed fluid impermeable containment structure decreases.

In the first potential embodiment of the disclosure, the liquid phase working fluid 141 is water. In the first potential embodiment of the disclosure, the gas phase working fluid 142 is air.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Cant: As used in this disclosure, a cant is an angular deviation from one or more reference lines (or planes) such as a vertical line (or plane) or a horizontal line (or plane).

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compress: In this disclosure, compress means to apply a force to force a fixed mass of material into a smaller volume of space.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Fishing Rod: As used in this disclosure, a fishing rod is a tapered shaft to which a fishing line is attached.

Fitting: As used in this disclosure, a fitting is a component that attaches a first object to a second object. The fitting is used to form a fluidic connection between the first object and the second object.

Flexible: As used in this disclosure, flexible refers to an object or material that will deform when a force is applied to it but that will not necessarily return to its original shape when the deforming force is removed.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Flush: As used in this disclosure, the term flush is used to describe the alignment of a first surface and a second surface to form a single structure selected from the group consisting of a Euclidean plane and a non-Euclidean plane.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Inelastic Nature: As used in this disclosure, an inelastic nature refers to a flexible structure that maintains its new shape after the flexible structure has been deformed.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Liquid: As used in this disclosure, a liquid refers to a state (phase) of matter that is fluid and that maintains, for a given pressure, a fixed volume that is independent of the volume of the container.

Modulus: As used in this disclosure, the modulus of an elastomeric structure is a function that describes the resistance to the deformation of an elastomeric structure as a function of the force applied to the elastomeric structure. When comparing modulus, a larger modulus is taken to imply a greater force is required to achieve the same deformation.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Relaxed Shape: As used in this disclosure, a structure is considered to be in its relaxed state when no shear, strain, or torsional forces are being applied to the structure.

Roughly: As used in this disclosure, roughly refers to a comparison between two objects. Roughly means that the difference between one or more parameters of the two compared objects are not significantly different.

Semi-Enclosed Prism: As used in this disclosure, a semi-enclosed prism is a prism-shaped structure wherein a portion of the lateral face of the prism-shaped is removed or otherwise replaced with a negative space.

Stiff and Stiffness: As used in this disclosure, the terms stiff and stiffness are comparative terms that used to compare the relative rigidity of two objects. Specifically, if a given force is applied to a first object and a second object, the object that deforms less is said to be stiffer or more stiff than the object that displayed greater deformation.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object. Always use major and minor axes.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis. Always use taper.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Viscosity: As used in this disclosure, viscosity refers to the resistance of a liquid or an elastic material to deformation. Higher viscosity would refer to a greater resistance to flow or to deformation. The term centipoise refers to the units of measurement of viscosity in a liquid. In this disclosure: a) a viscosity of greater that 80 centipoise is considered a high viscosity; and, b) a viscosity of greater than 2000 centipoise is considered a gel like viscosity.

Viscous: As used in this disclosure, a viscous material is a material with a viscosity such that the viscous material has characteristics intermediate between a liquid and a solid.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tension-adjusting fishing pole comprising
    wherein the tension-adjusting fishing pole comprises a first pole structure, a second pole structure, a fitting structure and a plurality of working fluids;
    wherein the fitting structure attaches the first pole structure to the second pole structure to form a fluid impermeable containment structure;
    wherein the plurality of working fluids are contained in the fluid impermeable containment structure.

2. The tension-adjusting fishing pole according to claim 1
    wherein the tension-adjusting fishing pole is a fishing rod;
    wherein the tension-adjusting fishing pole has a composite structure;
    wherein the tension-adjusting fishing pole is a flexible structure with an elastic nature;
    wherein by flexible is meant that the tension-adjusting fishing pole will deform when a deformation force is applied to the tension-adjusting fishing pole from a direction that is perpendicular to the center axis of the composite structure of the tension-adjusting fishing pole;
    wherein the tension-adjusting fishing pole has an adjustable stiffness;
    wherein by adjustable stiffness is meant that the modulus of the response of the tension-adjusting fishing pole to the deformation force is adjustable.

3. The tension-adjusting fishing pole according to claim 2
    wherein the first pole structure is a hollow structure;
    wherein the first pole structure is a flexible structure with an elastic nature;
    wherein the first pole structure has a semi-enclosed structure;
    wherein the first pole structure comprises a characteristic negative space;
    wherein the characteristic negative space defines the semi-enclosed structure of the first pole structure;
    wherein the first pole structure has a tapered structure;
    wherein the first pole structure has a tubular structure;
    wherein the first pole structure has a capped tube structure.

4. The tension-adjusting fishing pole according to claim 3
    wherein the second pole structure is a hollow structure;
    wherein the second pole structure is a flexible structure with an elastic nature;
    wherein the second pole structure has a tapered structure;
    wherein the second pole structure has a tubular structure;
    wherein the second pole structure has a capped tube structure.

5. The tension-adjusting fishing pole according to claim 4
    wherein the first pole structure forms a portion of the structure that contains the plurality of working fluids;
    wherein the first pole structure forms the structure that adjusts the pressure of the plurality of working fluids contained within the tension-adjusting fishing pole;
    wherein the second pole structure forms a portion of the structure that contains the plurality of working fluids;
    wherein the second pole structure forms the structure that adjusts the pressure of the plurality of working fluids contained within the tension-adjusting fishing pole.

6. The tension-adjusting fishing pole according to claim 5
    wherein the fitting structure is a fitting;
    wherein the fitting structure attaches the first pole structure to the second pole structure to form a composite structure;
    wherein the fitting structure attaches the first pole structure to the second pole structure to form an enclosed fluid impermeable containment structure;
    wherein the enclosed fluid impermeable containment structure contains the plurality of working fluids;
    wherein the fitting structure forms a fluidic connection between first pole structure and the second pole structure;
    wherein the fitting structure forms a fluid impermeable seal between the first pole structure and the second pole structure.

7. The tension-adjusting fishing pole according to claim 6
    wherein the plurality of working fluids form the fluids that are contained within the enclosed fluid impermeable containment structure formed by the tension-adjusting fishing pole;
    wherein the plurality of working fluids is formed from a combination of a compressible working fluid and an incompressible working fluid;
    wherein the compressible working fluid is a gas phase working fluid and the incompressible working fluid is a liquid phase working fluid;
    wherein the modulus of the tension-adjusting fishing pole changes by adjusting the pressure of the plurality of working fluids within the enclosed fluid impermeable containment structure formed by the tension-adjusting fishing pole;
    wherein the volume of the enclosed fluid impermeable containment structure is changed such that the pressure of the gas phase working fluid within the enclosed fluid impermeable containment structure changes.

8. The tension-adjusting fishing pole according to claim 7
    wherein the fitting structure further comprises a first fitting element and a second fitting element;
    wherein the first fitting element forms a fluidic connection between the plurality of working fluids contained within the first pole structure and the second fitting element;
    wherein the second fitting element forms a fluidic connection between the plurality of working fluids contained within the second pole structure and the first fitting element.

9. The tension-adjusting fishing pole according to claim 8
    wherein the first pole structure further comprises a compression membrane and a relief valve;
    wherein the compression membrane encloses the characteristic negative space;
    wherein the relief valve forms a fluidic connection between the plurality of working fluids and the atmosphere.

10. The tension-adjusting fishing pole according to claim 9
    wherein the compression membrane is a sheeting structure;
    wherein the compression membrane is a flexible structure;
    wherein the compression membrane is a fluid impermeable structure;
    wherein the compression membrane forms a fluid impermeable seal with boundary of the characteristic negative space.

11. The tension-adjusting fishing pole according to claim 10
    wherein the first fitting element is a mechanical structure;
    wherein the first fitting element is a composite structure;
    wherein the first fitting element is a tubular structure;

wherein the first fitting element attaches to the open end of the capped tube structure of the first pole structure to form a composite structure;

wherein the first fitting element attaches to the second fitting element to secure the first pole structure to the second pole structure to form the enclosed fluid impermeable containment structure.

12. The tension-adjusting fishing pole according to claim 11 wherein the second fitting element is a mechanical structure;

wherein the second fitting element is a composite structure;

wherein the second fitting element is a tubular structure;

wherein the second fitting element attaches to the open end of the capped tube structure of the second pole structure to form a composite structure;

wherein the second fitting element attaches to the first fitting element to secure the second pole structure to the second pole structure to form the enclosed fluid impermeable containment structure;

wherein the second fitting element forms a fluid impermeable seal with the first fitting element.

13. The tension-adjusting fishing pole according to claim 12 wherein the first fitting element further comprises a first channel and a first screw thread;

wherein the first channel is a negative space within the first fitting element;

wherein the first channel forms a composite structure with the first fitting element;

wherein the first channel is geometrically identical to the open face of the capped tube structure of the first pole structure;

wherein the first fitting element attaches to the first pole structure such that the lateral face of the first channel is flush with the hollow interior surface of the capped tube structure of the first pole structure;

wherein the first screw thread forms a portion of a threaded connection that attaches the first fitting element to the second fitting element;

wherein the first screw thread forms a fluid impermeable seal between the first fitting element and the second fitting element;

wherein the first screw thread is selected from the group consisting of an exterior screw thread and an interior screw thread.

14. The tension-adjusting fishing pole according to claim 13 wherein the second fitting element further comprises a second channel and a second screw thread;

wherein the second channel is a negative space within the second fitting element;

wherein the second channel forms a composite structure with the second fitting element;

wherein the second channel is geometrically identical to the open face of the capped tube structure of the second pole structure;

wherein the second fitting element attaches to the second pole structure such that the lateral face of the second channel is flush with the hollow interior surface of the capped tube structure of the second pole structure;

wherein the second screw thread forms a portion of a threaded connection that attaches the second fitting element to the first fitting element;

wherein the second screw thread forms a fluid impermeable seal between the second fitting element and the first fitting element;

wherein the second screw thread is selected from the group consisting of an exterior screw thread and an interior screw thread.

15. The tension-adjusting fishing pole according to claim 14 wherein the selected second screw thread is the screw thread that was not selected to be the first screw thread;

wherein the second screw thread forms a threaded connection with the first screw thread;

wherein the second screw thread secures to the first screw thread such that the lateral face of the second screw thread is flush with the lateral face of the first screw thread.

* * * * *